United States Patent [19]

Ballé et al.

[11] 3,972,723

[45] Aug. 3, 1976

[54] MORTAR OF INORGANIC BINDER AND SULFONIC ACID GROUP-CONTAINING FORMALDEHYDE CONDENSATION PRODUCT WITH CYCLOALKANONE

[75] Inventors: Gerhard Ballé, Cologne; Dieter Dieterich, Leverkusen; Kurt Schaupp, Cologne, all of Germany

[73] Assignee: Bayer Aktiengesellschaft, Leverkusen, Germany

[22] Filed: Aug. 14, 1974

[21] Appl. No.: 497,364

[30] Foreign Application Priority Data

Aug. 18, 1973 Germany............................ 2341923

[52] U.S. Cl................................. 106/90; 106/97; 106/98; 106/109; 106/111; 106/314
[51] Int. Cl.².......................................... C04B 7/35
[58] Field of Search ............... 106/90, 314, 111, 97, 106/98, 109

[56] References Cited
UNITED STATES PATENTS 3,661,829   5/1972   Aignesberger et al................ 106/90
3,852,081  12/1974   Lehman................................. 106/90

*Primary Examiner*—J. Poer
*Attorney, Agent, or Firm*—Burgess, Dinklage & Sprung

[57] ABSTRACT

A mortar comprising an inorganic binder such as anhydrite, gypsum or cement is rendered more flowable and processible by incorporating therein a sulfonic acid group-containing formaldehyde condensation product with a cycloalkanone, e.g. preferably about 0.05 to 5% by weight of the binder of the condensation product of sodium sulfite, formaldehyde and cyclohexanone. There may also be present an auxiliary such as $FeSO_4 \cdot 7 H_2O, Al_2(SO_4)_3 \cdot 18 H_2O$ or $KAl(SO_4)_2$, as well as an additive such as a plasticizer, hardening accelerator, retarder, air-entraining agent, thickener, activator, anti-foam agent or synthetic resin dispersion, and/or an aggregate such as sand, silica, perlite, pumice or foamed plastic beads.

7 Claims, No Drawings

MORTAR OF INORGANIC BINDER AND SULFONIC ACID GROUP-CONTAINING FORMALDEHYDE CONDENSATION PRODUCT WITH CYCLOALKANONE

In the production of structural components such as floor toppings, wall panels, walls and ceilings, inorganic binders, such as anhydrite (natural and synthetic), gypsum or cement, are mixed, occasionally in undiluted form, but generally together with such aggregates as sand, silica, perlite, pumice or foamed plastic beads, and with water, optionally using additives such as air-entraining agents or plasticizers, and processed in this form. If the structural components produced from this mortar are to show favorable properties, it is essential to use a low water-binder factor, (WBF) i.e. to use as little water as possible, based on the binder used. Unfortunately, this often makes the mortar viscous. If the water content is further reduced, the mortar loses its plasticity and, hence, also its compactability. The production of high-quality structural components from a mortar of this kind involves intensive, mechanical compaction by vibration and/or compression. Since even this is not sufficient for a number of purposes, it is often necessary to use increased quantities of binder in order to obtain the required properties of, for example, high strength, quick setting and early strippability and imperviousness.

All the measures referred to above involve increased labor and, hence, also involve increased costs. Accordingly, these measures are not often applied and instead the mortar is made easier to work by increasing the water-binder factor. The result is often quality defects in or damage to the structural components thus produced.

Accordingly, attempts have been made to improve the workability of mortars by means of chemical additives. Thus, it is known that so-called plasticizers can be used for concrete. The plasticizers used are almost entirely surface-active substances, such as for example alkylaryl sulfonates, ethylene oxide addition products, alkyl phenol polyglycolethers or ligninsulfonates and mixtures thereof. These products are generally added to the binder in quantities of from 0.01% to 0.1%. Even using optimum dosage, the saving of water or the increase in flowability hardly amounts to more than from 10% to 12%. Rather than significantly increasing the plasticizing effect a larger addition almost always has a considerable adverse effect upon the properties of the mortar. Above all, they increase its setting time and air-pore content and reduce its strength value.

The addition of a modified amino-s-triazine resin to inorganic binders is proposed in Austrian Pat. No. 263,607. This addition is said to provide a building material with high bond strength, tensile strength and compressive strength and to improve the quality of its surface.

German Pat. No. 1,238,831 proposes a naphthalene sulfonic acid derivative/formaldehyde condensate as a dispersant for cement, while German OS No. 2,131,518 proposes a homopolymer or copolymer of amides or imides of unsaturated carboxylic acids substituted through the amide or imide nitrogen atoms by, for example alkyl- or aryl groups containing sulphonic acid groups.

Even though these products have a favorable plasticizing effect on various binders, they may in some instances tend to induce overrapid sedimentation of binder and/or aggregate, which seriously impairs strength and has an adverse effect upon the surface quality of structural components produced in this manner.

It is accordingly an object of the present invention to modify a mortar so as to render it more processible in the course of producing structural components of superior strength and other properties.

These and other objects and advantages are realized in accordance with the present invention pursuant to which there is provided a mortar comprising an inorganic binder and a sulfonic acid group-containing formaldehyde condensation product with a cycloalkanone. In accordance with the invention the mortar may further contain at least one additive selected from the group consisting of a plasticizer, hardening accelerator, retarder, air-entraining agent, thickener, activator, anti-foam agent or synthetic resin dispersion and/or at least one aggregate selected from the group consisting of sand, silica, perlite, pumice or foamed plastic beads.

The condensation products used in accordance with the invention can be obtained, for example, by condensing formaldehyde and alkali metal salts of sulfurous acid with cycloalkanones of the formula

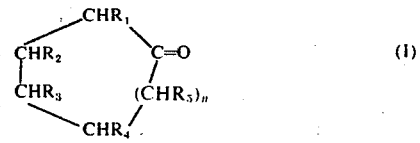

wherein:
n is 0 or 1; and
$R_1$ to $R_5$ each independently is hydrogen or alkyl of 1 to 6 carbon atoms, such as for example methyl, ethyl, isopropyl, hexyl.

Compounds of formula I are known from the literature. The production of the formaldehyde condensation products containing sulfonic acid groups added to the mortar in accordance with the invention from compounds of formula (I) is known, for example, from German OS No. 1,720,729. According to this publication, the reactants, optionally diluted with water, are mixed together with intensive stirring at a moderately elevated temperature, for example at temperatures of from 25 to 60°C, preferably at a temperature of from 25 to 35°C, resulting immediately in an exothermic reaction which can increase the temperature of the system up to its boiling point. Condensation is completed by subsequently heating to the boiling point. Thus, condensation products according to the invention can be obtained, for example, by condensing cycloalkanones such as cyclopentanone, cyclohexanone and isomeric methylcyclohexanones, alone or in admixture, with aqueous formaldehyde solutions or with formaldehyde donors, such as paraformaldehyde or 1,3,5-trioxane and alkali metal salts of sulforous acid, for example sodium sulfite, potassium sulfite, sodium hydrogen sulfite, potassium hydrogen sulfite, sodium pyrosulfite or potassium pyrosulfite. The quantitative ratios between the reactants can vary within relatively wide limits. Condensates having a favorable plasticizing effect can be obtained by condensing 1 mole of cyclohexanone with about 0.75 to 4 moles, preferably about 1.05 to 2.5 moles of formaldehyde and about 0.1 to 1.2 moles, preferably about 0.25 to 1.0 mole, of an alkali metal sulfite, including an alakli metal hydrogen sulfite, or with about 0.05 to 0.6 mole, preferably about 0.125 to 0.5 mole, of an alakli metal pyrosulfite. Instead of using pure cycloalkanones, it is possible to use crude reaction mixtures obtained from the production of cycloalkanone, distillation residues, etc., either on their own or in conjunction with pure cycloalkanones. The preferred cycloalkanone is cyclohexanone.

The molecular weight of the condensation product used in accordance with the invention amounts to between about 400 to 30,000, preferably to between about 1200 and 20,000. The condensation products can be used both in the form of an aqueous solution and in powder form. If necessary, a powderform product can be obtained from the aqueous solution by spray drying.

The condensation products used in accordance with the invention are employed in a quantity of from about 0.05 to 5% by weight, preferably in a quantity of about 0.2 to 2% by weight, based on the binder. Quantities of this order have such an intense plasticizing effect upon the mortar that even the mortar produced with a relatively low water-binder factor is either spontaneously free-flowing or only requires minimal mechanical working to be brought into the form of compact structural components. Where the products according to the invention are added to the mortar, the water-binder factor can be considerably reduced, for example for the same degree of compaction, resulting in the formation of structural components with extremely good properties, such as high strength, low porosity and, hence, high imperviousness. On the other hand, it is possible, for the same waterbinder factor or with only a slight reduction in the quantity of mixing water, to obtain such a heavily plasticized mortar that there is no longer any need for compaction. If necessary, the mortar obtained in this way can be allowed to level out smoothly and evenly almost entirely on its own. Since the mortar produced in accordance with the invention generally contains only a relatively small amount of water, this material does not have any tendency to "bleed", in other words binder, aggregate and water remain in the form of a homogeneous mass, even after prolonged standing, nor does any of the mixing water rise to the surface during compaction by vibration. Aggregates can readily be used in a quantity of up to about 300% by weight, preferably to a quantity of about 150 to 200% by weight, based on the binder. The condensation products according to the invention are preferably used in the production of free-flow mortars and free-flow toppings, especially those based on anhydrite as the binder, in which case the extremely good plasticizing effect is particularly apparent, even in the presence of aggregates in the quantities referred to.

In certain applications, a further improvement can be obtained by combining the compounds according to the invention with special auxiliaries and/or additives. In the context of the invention, auxiliaries are substances which react with a basically acting binder, i.e. in the case of synthetic anhydrite reacting with the lime which is always present, to form substantially insoluble hydroxides which, in turn, are able to form with other basic components hydraulically setting compounds which are incorporated into the solidifying mortar. It is possible in this way to obtain particularly strong mortar structures which, in the case of floor toppings, not only have increased compressive strength, but also a considerably greater surface abrasion resistance. Auxiliaries of this kind are, for example, $FeSO_4 \cdot 7 H_2O$, $Al_2(SO_4)_3$ or $KAl(SO_4)_2$. They can be added to the binder in quantities of about 0.1 to 5% by weight, preferably in quantities of about 0.2 to 2% by weight.

For special applications, it is also possible to use combinations with other additives, for example with conventional plasticizing agents (for example with condensation products of nonylphenol with ethyleneoxide), hardening accelerators (for example $CaCl_2$ for cement or $K_2SO_4$ for anhydrite), sealing compounds (for example alkaline earth metal salts of stearic acid), air-entraining agents (for example calcium ligninsulfonate), retarders (for example salts of tartaric acid or of citric acid) or synthetic resin dispersions, especially those all based on polyvinylacetate, polyvinylpropionate and polyacrylates, and also their copolymers.

The invention will be further described in the following illustrative examples wherein all parts are by weight unless otherwise specifically expressed.

EXAMPLE 1

A. Preparation of the condensation product 98g (1 mole) of cyclohexanone are intensively stirred with a solution of 84g (0.67 mole) of sodium sulfite in 200 ml of water in a spherical flask equipped with a stirrer, reflux condenser, thermometer and dropping funnel. 170g (1.67 mole) of an approximately 30% aqueous formaldehyde solution are then added at a temperature of 30° to 35°C, after which the initially two-phase mixture changes accompanied by a gradual increase in temperature into a slightly hazy, yellowish, slightly foaming moderately viscous solution which begins to boil spontaneously under the effect of an exothermic reaction. After the reaction has ceased, the mixture is stirred for two hours at boiling point. A sample obtained by concentration through evaporation contains 38.2% of a viscous, yellow resin with a molecular weight of approximately 6000.

B. Production of an anhydrite mortar i. The following components were made into moist paste over a total mixing time of 3 minutes in a 10 liter planetary mixer:

5 kg of synthetic anhydrite,
0.05 kg of potassium sulfate (=1% of activator),
1.5 kg of water (WBF = 0.30).

ii. In a second test, 130 g of the condensation product obtained in accordance with (A), corresponding to a weight ratio of anhydrite:condensation product solids of 100:1, were added to the same mixture as in (i). The slump factor of the compositions obtained in both tests was determined as a measure of plasticization, and the strengths of the 4 × 4 × 16 cm prisms produced with these compositions were tested after different periods of storage.

iii. In a third test, in which 1% of the condensation product was added, the water-binder factor was reduced until the slump factor of the zero sample 1 (i) was reached. In this case, only 1.1 kg of water were required for a slump factor of 11.5/17 cm (WBF = 0.22). The strength values obtained both in this test and in tests 1 (i) and 1 (ii) are set out in the following Table: Table 1 (Strengths of anhydrite samples).

Table 1

| | (Strengths of anhydrite samples) | | | |
|---|---|---|---|---|
| Sample | Slump (cm) before/after 15 shocks | Strengths kgf/cm² Bending tension/compressive | | |
| | | after 3 days | after 7 days | after 28 days |
| 1.1 | 11/16 | 59/316 | 75/410 | 83/418 |
| 1.2 | 47/49 | 73/394 | 82/401 | 95/452 |
| 1.3 | 11.5/17 | 76/418 | 85/492 | 114/564 |

EXAMPLE 2 i. A cement mortar was prepared from the following components:

25 kg of Portland cement = 20 l
112 kg of sand/gravel of (0-7 mm) = 81 l corresponding to a part per volume ratio of 1:4
11 kg of water.

Since the sand additionally contains 3.6% of water the total quantity of water is 15 kg, in other words the water-cement factor (WCF) amounts to 0.60. The slump factor as measured with a slump funnel amounted to 10/14 cm. The strengths obtained are set out in Table 2.

ii. In another test, 0.5 kg, corresponding to 0.8% solids based on cement, of a condensation product prepared in accordance with Example 1 (A) from 1 mole of cyclohexanone, 1.6 mole of formaldehyde, 0.33 mole of sodium sulfite and 0.167 mole of sodium pyrosulfite, with a solids content of 40% and a molecular weight of approximately 2200, are added to the same mixtures. The quantity of water was reduced to 7 kg, so that the same slump factor as in 1 (i) was obtained. Including the quantity of water present in the sand, the total quantity of water amounted to 11 kg, corresponding to a WCF of 0.44. The following strengths were obtained:

Table 2

| | | (Strengths of cement mortars) | | | |
|---|---|---|---|---|---|
| Mixture | WCF | Slump (cm) before/after 15 shocks | Strengths kg/cm² Bending tension/compressive | | |
| | | | after 3 days | after 7 days | after 28 day |
| 2.1 | 0.60 | 10/14 | 37/156 | 49/274 | 63/326 |
| 2.2 | 0.44 | 10/13.8 | 54.233 | 67/341 | 85/477 |

EXAMPLE 3

An anhydrite mortar of 100 parts of weight of synthetic anhydrite, 1 part by weight of K₂SO₄ and 30 parts by weight of water had a slump factor of 12/20 cm. 1%, based on anhydrite, of the condensation product mentioned in Example 2(ii), expressed as solid substance, was added to 6 different mortars which had been prepared with different anhydrite fractions from standard production. All 6 mortars had a slump factor of more than 50/50cm.

It will be appreciated that the instant specification and examples are set forth by way of illustration and not limitation, and that various modifications and changes may be made without departing from the spirit and scope of the present invention.

What is claimed is:

1. A mortar comprising an inorganic binder and about 0.05 to 5% by weight of the binder of a condensation product comprising a cycloalkanone, about 0.75 to 4 moles of formaldehyde per mole of cycloalkanone, and about 0.1 to 1.2 moles of an alkali metal sulfite or about 0.05 to 0.6 mole of an alkali metal pyrosulfite per mole of a cycloalkanone.

2. A mortar as claimed in claim 1, wherein said condensation product is a condensation product of formaldehyde, an alkali metal salt of sulfurous or pyrosulfurous acid and a cycloalkanone of the formula

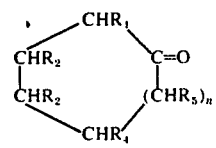

in which
$n$ is 0 or 1, and
$R_1$ to $R_5$ each independently is hydrogen or alkyl having up to 6 carbon atoms.

3. A mortar as claimed in claim 1, wherein the condensation product has an average molecular weight of about 400 to 30,000.

4. A mortar as claimed in claim 1, wherein the cycloalkanone is at least one of cyclohexanone and cyclopentanone.

5. A mortar as claimed in claim 1, further comprising at least one auxiliary selected from the group consisting of $FeSO_4 \cdot 7 H_2O$, $Al_2(SO_4)_3 \cdot 18 H_2O$ and $KAl(SO_4)_2$ present in about 5% by weight of the binder.

6. A mortar as claimed in claim 1, further comprising at least one aggregate selected from the group consisting of sand, silica, perlite, pumice and foamed plastic beads.

7. A mortar as claimed in claim 4, wherein the condensation product comprises about 1.05 to 2.5 moles of formaldehyde, and about 0.25 to 1 mole of an alkali metal sulfite or about 0.125 to 0.5 mole of an alkali metal pyrosulfite per mole of cycloalkanone, has an average molecular weight of about 1,200 to 20,000 and is present in about 0.2 to 2% by weight of the inorganic binder, said inorganic binder comprises at least one member selected from the group consisting of anhydrite, gypsum and cement, said mortar further comprising at least one auxiliary selected from the group consisting of $FeSO_4 \cdot 7 H_2O$, $Al_2(SO_4)_3 \cdot 18 H_2O$ and $KAl(SO_4)_2$, present in about 0.5 to 1.5% by weight of the inorganic binder, and further comprising at least one aggregate selected from the group consisting of sand, silica, perlite, pumice or foamed plastic beads.

* * * * *